US007669766B2

(12) United States Patent
Ahmadi et al.

(10) Patent No.: US 7,669,766 B2
(45) Date of Patent: Mar. 2, 2010

(54) MULTIPLE TECHNOLOGY ROUTER FOR RADIO FREQUENCY IDENTIFICATION (RFID) AND BARCODE

(76) Inventors: Homayoun Ahmadi, 85 Ferrier Street, Unit #5, Markham, Ontario (CA) L3R 2Y9; M. Reza Soudmad-Asli, 85 Ferrier Street, Unit #5, Markham, Ontario (CA) L3R 2Y9; Hassanali Namazi, 85 Ferrier Street, Unit #5, Markham, Ontario (CA) L3R 2Y9

( * ) Notice: Subject to any disclaimer, the term of this patent is extended or adjusted under 35 U.S.C. 154(b) by 1379 days.

(21) Appl. No.: 11/023,175

(22) Filed: Mar. 23, 2005

(65) Prior Publication Data

US 2006/0213989 A1    Sep. 28, 2006

(51) Int. Cl.
    *G06K 7/08* (2006.01)
(52) U.S. Cl. .................. 235/451; 235/440; 235/462.15; 235/462.13
(58) Field of Classification Search ................. 235/451, 235/440, 462.15, 462.13
    See application file for complete search history.

(56) References Cited

U.S. PATENT DOCUMENTS

| 5,280,159 | A  | * | 1/1994  | Schultz et al. ............... 235/382 |
| 5,719,382 | A  | * | 2/1998  | White ........................ 235/375 |
| 5,726,388 | A  | * | 3/1998  | Ferland ...................... 174/72 C |
| 5,809,142 | A  | * | 9/1998  | Hurta et al. .................... 705/68 |
| 5,925,873 | A  | * | 7/1999  | Kumar .................... 235/472.02 |
| 6,078,251 | A  | * | 6/2000  | Landt et al. .............. 340/10.41 |
| 6,415,978 | B1 | * | 7/2002  | McAllister .............. 235/462.01 |
| 6,877,663 | B2 | * | 4/2005  | Kelly et al. ............. 235/462.15 |
| 2002/0016739 | A1 | * | 2/2002  | Ogasawara .................. 705/22 |
| 2004/0113791 | A1 | * | 6/2004  | Salim et al. ............. 235/462.13 |
| 2004/0196143 | A1 | * | 10/2004 | Crump et al. ........... 235/462.01 |
| 2006/0109122 | A1 | * | 5/2006  | Deeds ...................... 340/572.1 |

* cited by examiner

*Primary Examiner*—Michael G Lee
*Assistant Examiner*—Kristy A Haupt

(57) ABSTRACT

A multiple technology router for radio frequency identification (RFID) and barcode, the device has three ports, one to connect to an external barcode reader, and one to connect to an internal or external RFID reader/writer and finally one to connect to a host computer. The device constantly monitors port connected to barcode reader for intercepting a barcode symbol, sends request to RFID device and checks for RFID tag being sensed. Upon receiving data from either port, the device executes a pre-programmed series of actions. The action can be simply routing data from either port to the host computer or read one or many barcode symbols and write the information to a RFID tag without using a host computer. Additional actions such as EAS bit operation, incrementing/decrementing counters within a RFID tag and writing current time and date to an RFID tag can be done along with the main action of the device. The device can indicate the success or failure of operations audibly and visibly.

15 Claims, 10 Drawing Sheets

MULTIPLE TECHNOLOGY ROUTER FOR RADIO FREQUENCY IDENTIFICATION (RFID) AND BARCODE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of Radio Frequency Identification (RFID) and more specifically to a multiple technology router for radio frequency identification (RFID) and barcode.

The field of present invention relates to radio frequency identification (RFID) and barcode technology. In particular, a device with provisions necessary for emerging RFID technology to smoothly and cost effectively substitute or coexist with barcode technology.

Barcode technology comprises a printed barcode symbol and an optical reader. The optical reader illuminates the barcode symbol, detects the pattern of light emitted back from the barcode symbol and differentiates darker and lighter areas. The optical reader then decodes emitted light and conveys the translated code to the host computer attached to the reader. RFID technology comprises a chip and antenna combination (RFID tag) and a reader/writer device. A Reader/Writer device communicates through electromagnetic waves with RFID tag. This communication includes operations such as sensing how many RFID tags are within a range of the reader by identifying a tag by its unique ID; reading the content of RFID tag at specific location of its memory, writing data into RFID tag, activating/deactivating EAS bit or disabling the RFID tag all together. There can be a combination of different aforementioned operations performed in one transaction such as a check-in and checkout process.

In the retail and rental check in and checkout process, inventory control and parking environments, barcode is currently the major component of the data collection system. Wherever barcode technology is being used, RFID technology is invaluable by its unique characteristics, which includes being read/write able without requiring line of sight with the reader, higher security and accommodation of higher volume of data without power consumption.

Due to the necessity of having a free line of sight for barcode technology, barcode labels cannot be used for loss prevention. Users who need to implement provisions for loss prevention have to use additional tags called electronic article surveillance (EAS) tags and special reader/antenna combinations to implement a relatively secure anti-heft environment.

RFID tags such as Philips I.CODE provide means for EAS functionality, such that there is no need for additional tags for anti-theft provisions. This functionality is implemented within a specific location of RFID tag memory (EAS bit). With such functionality, the user can use the same device, which reads and writes information from and into the RFID tag for deactivating the EAS bit during checkout or activating the EAS bit during check-in.

Although there are many benefits of RFID compared to barcode, in reality the implementation of RFID can be a lengthy process. To make a transition from barcode to RFID, users have many hurdles to pass such as changing their application software to be able to use RFID reader/writers, running a pilot to see if RFID is suitable for their application and educating the personnel for using new technology.

For example, in a library implementing RFID, it may not be possible to close the library to exchange all barcode labels with RFID tags. Gradual transition is the most efficient way of converting a barcode system into a RFID system. In a rental business i.e. video store, it is reasonable and beneficial to have RFID tags on video, DVD and games but it is economically not justifiable to have tags for high turnover incidentals such as snacks. In retail stores, it is impossible to convert to RFID instantly. Because of the logistics involved in the transition from barcode to RFID, cashiers will have to scan RFID tags as well as barcodes for a long period. It means that RFID and barcode will have to coexist temporary in some places and permanently in others.

Inventors such as Mr. McAllister from PSC scanning Inc. (U.S. Pat. No. 6,415,978) or Mr. Bridgelall from Symbol Technologies Inc. (U.S. Pat. No. 6,264,106) have thought about the importance of barcode and RFID coexistence and invented dual barcode and RFID readers. All such inventions require different levels of software change for users depending on how much of RFID capabilities they would integrate into their system. Another impediment to such inventions is that they are not capable of performing any action without connection to a host computer. The other issue that aforementioned inventions do not address is that every user of barcode technology already has at least one barcode reader and they cannot use this device combined with RFID reader. Therefore, to use both technologies together they have to pay for the barcode reader included in such dual readers.

BRIEF SUMMARY OF THE INVENTION

The present invention relates to methods and apparatus for a cost effective way to use RFID in places where barcode is being used and a transition to RFID is intended.

Another objective of the invention is to provide methods and apparatus for eliminating the need for changing the application software that is using barcode for data collection to be capable of using RFID and barcode at the same time.

Another objective of the invention is to provide methods and apparatus for eliminating the need of computer hardware and software for reading data from barcode symbol(s) or RFID tag(s) and writing it into one RFID tag.

The present invention provides methods and apparatus for eliminating the need of computer hardware and software for comparing data from one barcode symbol to the data contained in a RFID tag.

The present invention relates to methods and apparatus for eliminating the need of computer hardware and software for formatting and adding constant additional data while inputting data from barcode symbol or RFID tag and doing the same in outputting data to computer or RFID tag.

The present invention provides methods and apparatus for eliminating the need of computer hardware and software for writing current time and date in predefined format into RFID tag.

Other objectives and advantages of the present invention will become apparent from the following descriptions taken in connection with the accompanying drawings, wherein, by way of illustration and example, an embodiment of the present invention is disclosed.

In accordance with a preferred embodiment of the invention, there is disclosed a multiple technology router for radio frequency identification (RFID) and barcode comprising:

A housing,

A scanner port for connecting an external barcode reader,

A PC port for connecting to a host computer,

A RFID port for connecting a Radio Frequency Identification (RFID) unit,

A controller unit and Means to process and route data received from said scanner port and said RFID port to either or both said RFID port and said PC port.

In another embodiment, current invention includes display and buzzer to ensure that user will get feedback on each operation such as showing failure or success, as well as mode of operation, scan counts and EAS bit status.

In another embodiment, current invention includes a RFID reader/writer with internal antenna connected through RFID port to the communication unit within the controller unit.

In another embodiment, the current invention has another connection terminal for connecting a 50-Ohm external antenna.

In accordance with a preferred embodiment of the invention, there is a disclosed method of using a RFID tag for tracking the execution of an action performed on the RFID tag consisting of the following steps: upon execution of said action read a designated memory location of the RFID tag into a temporary memory, perform a defined criteria operation on the temporary memory and write the result back to the designated memory location of the RFID tag.

In accordance with a preferred embodiment of the invention, there is a disclosed method of flipping the EAS bit of a RFID tag with a RFID reader consisting of the following steps: send a command to the RFID tag to enquire the last status of the EAS bit if the last status of the EAS bit is active then send a command to RFID tag to deactivate the EAS bit and if the last status is not active then send a command to the RFD tag to activate the EAS bit.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Preferred embodiments will now be described with reference to the drawings.

Figure 1:
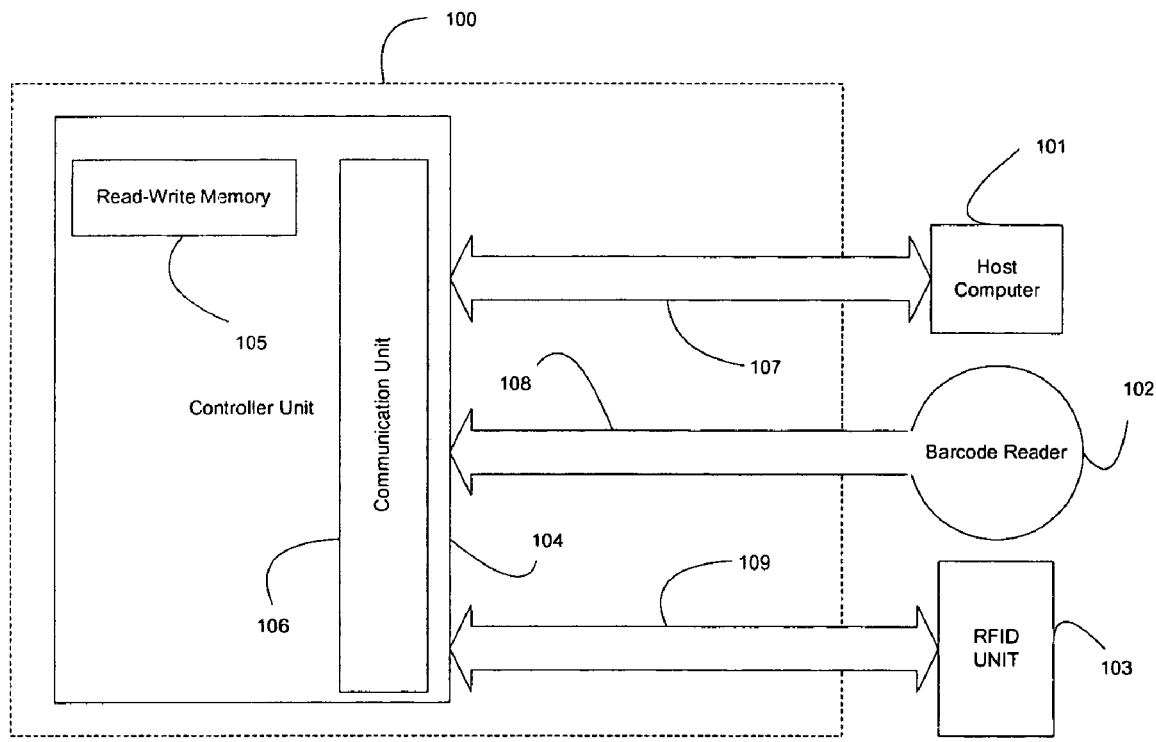
FIG. 1 to 4 illustrates four different system block diagrams for current invention's embodiments and logical connections between their components.

FIG. 1 is a system block diagram of preferred embodiment of a multiple technology router for radio frequency identification (RFID) and barcode 100. The device shown in 100 includes controller unit such as 104, which in turn includes a read-write memory 105 big enough to accommodate all configuration for the PC port 107 and the barcode port 108 and the RFID port 109 and all commands known to the RFID unit 103 as well as user specific formatting configurations. 105. The read-and-write memory contains a firmware for modes of operation described in flow charts later herein 104. The controller unit also includes communication unit 106 to control and implement different communication protocols such as serial (RS232 or RS485) or Universal Serial Bus (USB) or Transmission Control Protocol (TCP). It is obvious that if communication unit 106 is arranged such that if PC port 107 is serial, USB or TCP the host computer 101 compatible port must be used to connect the device 100 to the host computer 101 this compatibility further applies to the ports 108 and 109 such that compatible barcode reader 102 and RFID unit 103 must be used in conjunction with the device 100.

Figure 2:
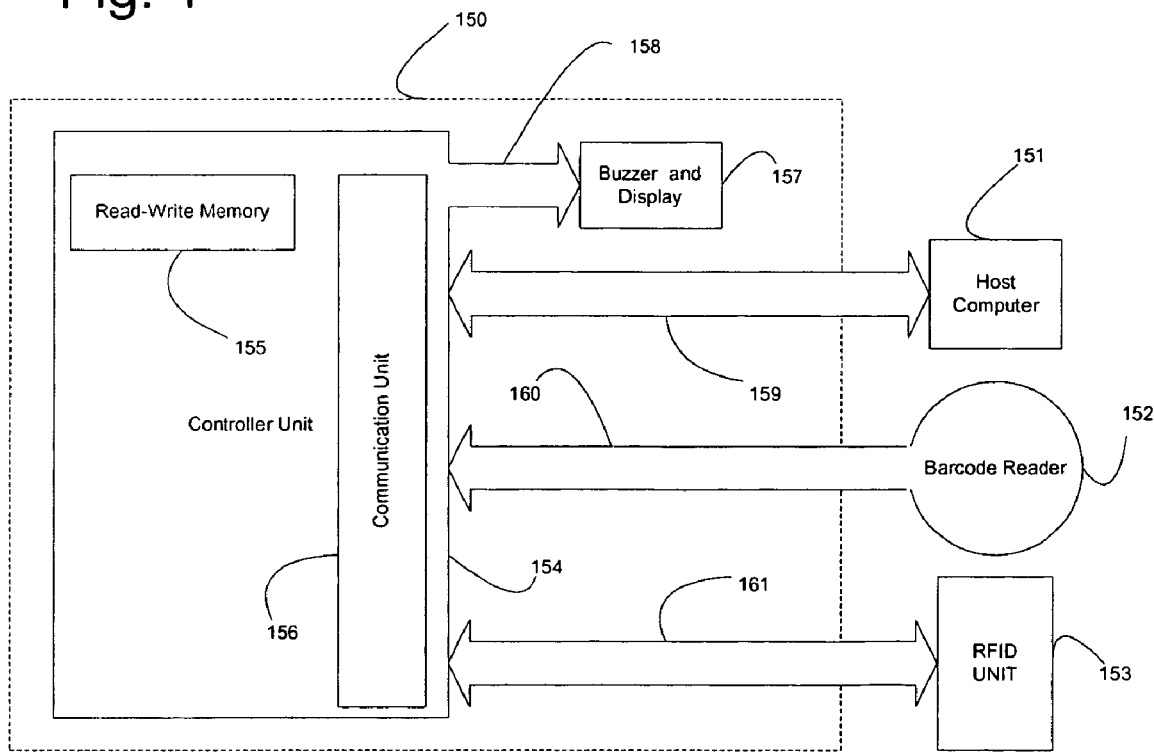

The embodiment shown in FIG. 2 illustrates block diagram of a device 150, an enhanced version of device 100 shown in FIG. 1 in which the feature of giving an audible and visible feedback on the result of operations to the user is added by using a buzzer and display unit 157 connected thorough a digital I/O 158 to the controller unit 154. Display within the display and buzzer unit 157 will be used to give information such as mode of operation, number of scan counts and latest status of EAS bit to the user as well.

Figure 3:
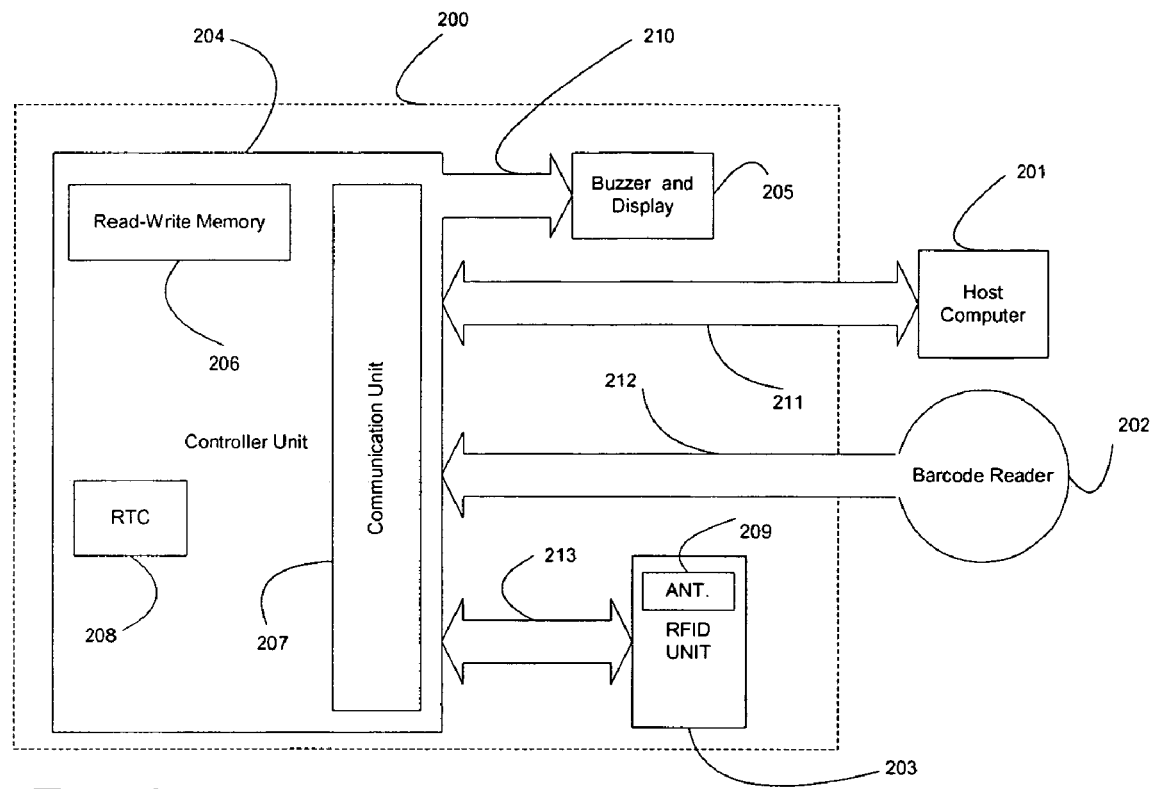

The embodiment shown in FIG. 3 illustrates block diagram of a device 200, an enhanced version of device 150 shown in FIG. 2 by including a RFID unit 203 connected to the controller unit 204 though an internal RFID port 213 RFID unit 203 in turn is equipped with an antenna 209 which will make the device 200 more suitable to the users who do not have the RFID reader/writer. In the embodiment 200 controllers unit 204 is equipped with real-time-clock (RTC) 208 to support the feature of writing time stamp to a RFID tag without using external computer such that RTC 208 keeps track of time. In the time stamp mode controller unit 204 checks every fraction of second if RFID unit 203 sensed presence of any RFID tag and further as the RFID tag becomes available will read the RTC 208 and will send the necessary commands to RFID unit 203 to write the current date and time into the RFID tag with programmed format stored in read-and-write memory 204.

Figure 4:
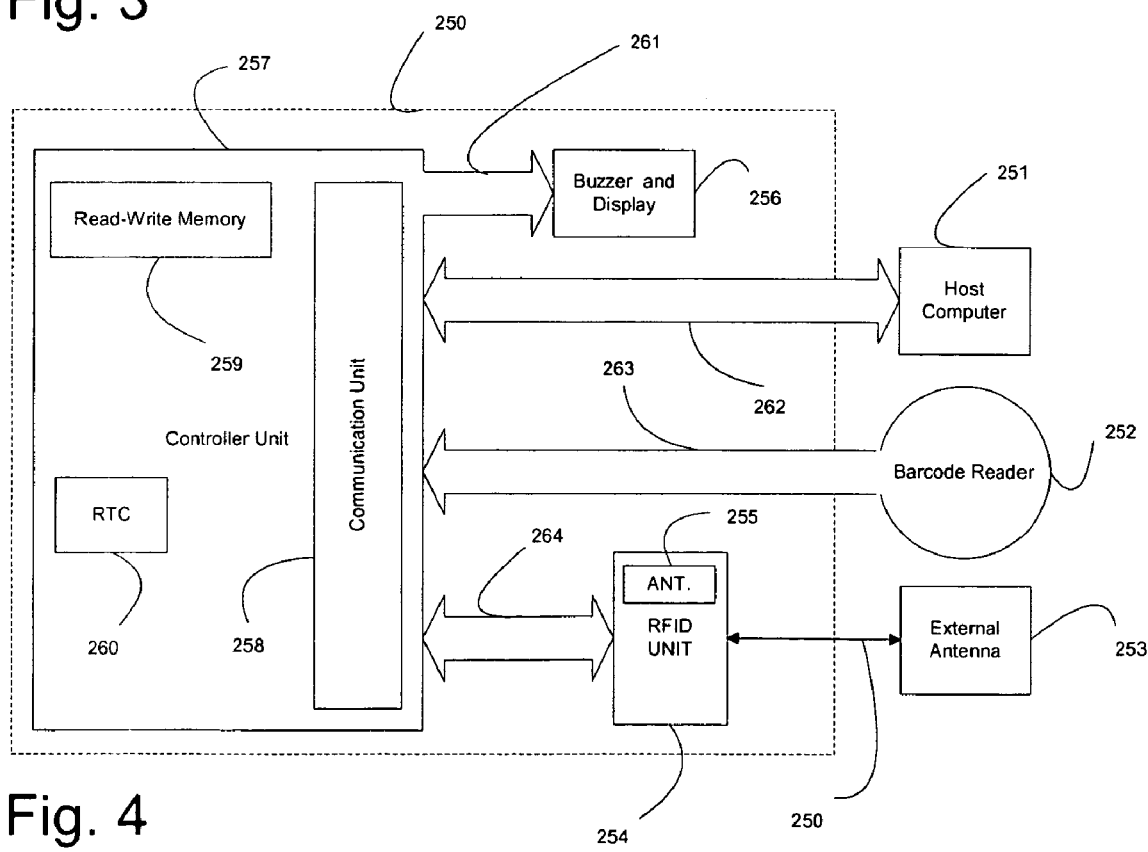

The embodiment shown in FIG. 4 illustrates block diagram of a device 250 which includes all the features explained in FIG. 3 as well as additional external antenna terminal 250 to be used for attaching external antenna such as 253 to RFID unit 254 to increase the range of communication. External antenna terminal 250 is arranged to have impedance of 50-Ohm, makes it suitable for connecting external antenna 253 with matching coaxial cable.

The flow charts in FIGS. 5 to 12 illustrate current invention firmware and will be explained with respect to embodiment depicted in FIG. 4

Figure 5:
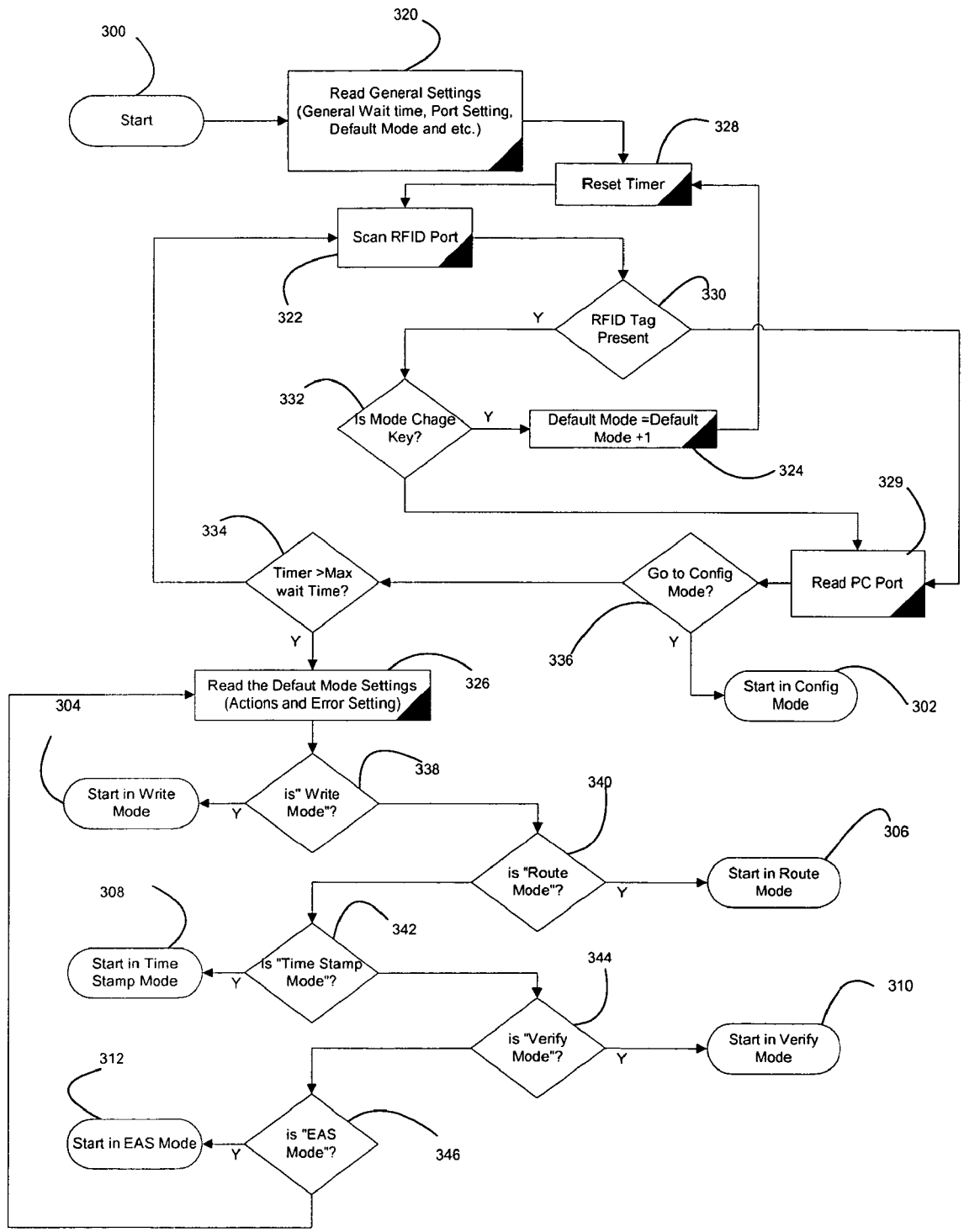
FIG. 5 is a flow chart of operations for starting up and mode change.

FIG. 5 is the flow chart that illustrates the start up procedure of the present invention. During the start up, user has a time window for switching from one mode of operation to another by using a RFID tag with pre-defined data stored in it (mode change key) as well as switching to configuration mode where user can select each mode of operation from available categorized operation modes such as write mode 304, route mode 306, timestamp mode 308, verify mode 310 and EAS mode 312. In configuration mode, user is capable of changing all general settings and settings for each mode of operation individually. Although user has to use the computer for setting up the device, computer is not necessary for day-by-day operation of the device after configuration is done. The start up procedure 300 is carried out such that controller unit 257 begins from start point 300 whenever cold reset occurs and it follows by reading all the general settings 320 including the port settings, the default mode of operation and general wait time from read-and-write memory 259 then it will start a timer 328, activates the RFID unit 254 and scans 322 the RFID port 264 and also checks 329 the PC port 262 every fraction of second. Once the presence of any RFID tag 330 is intercepted, controller unit 257 compares its content 332 with the mode change key, in the event of positive matching it will increment 324 the default mode of operation. During the boot up procedure 300 host computer 251 can send a request by known string of characters to PC port 262 once this request is received by controller unit 257 monitoring this port, it will switch to configuration mode and user can manipulate the setting from there. In the case that no more mode change key or request from host computer 251 being intercepted or the maximum time limit 334 has been reached, controller unit 257 will read the read-and-write memory 259 once more and will start the device in last valid operation mode.

Figure 6:
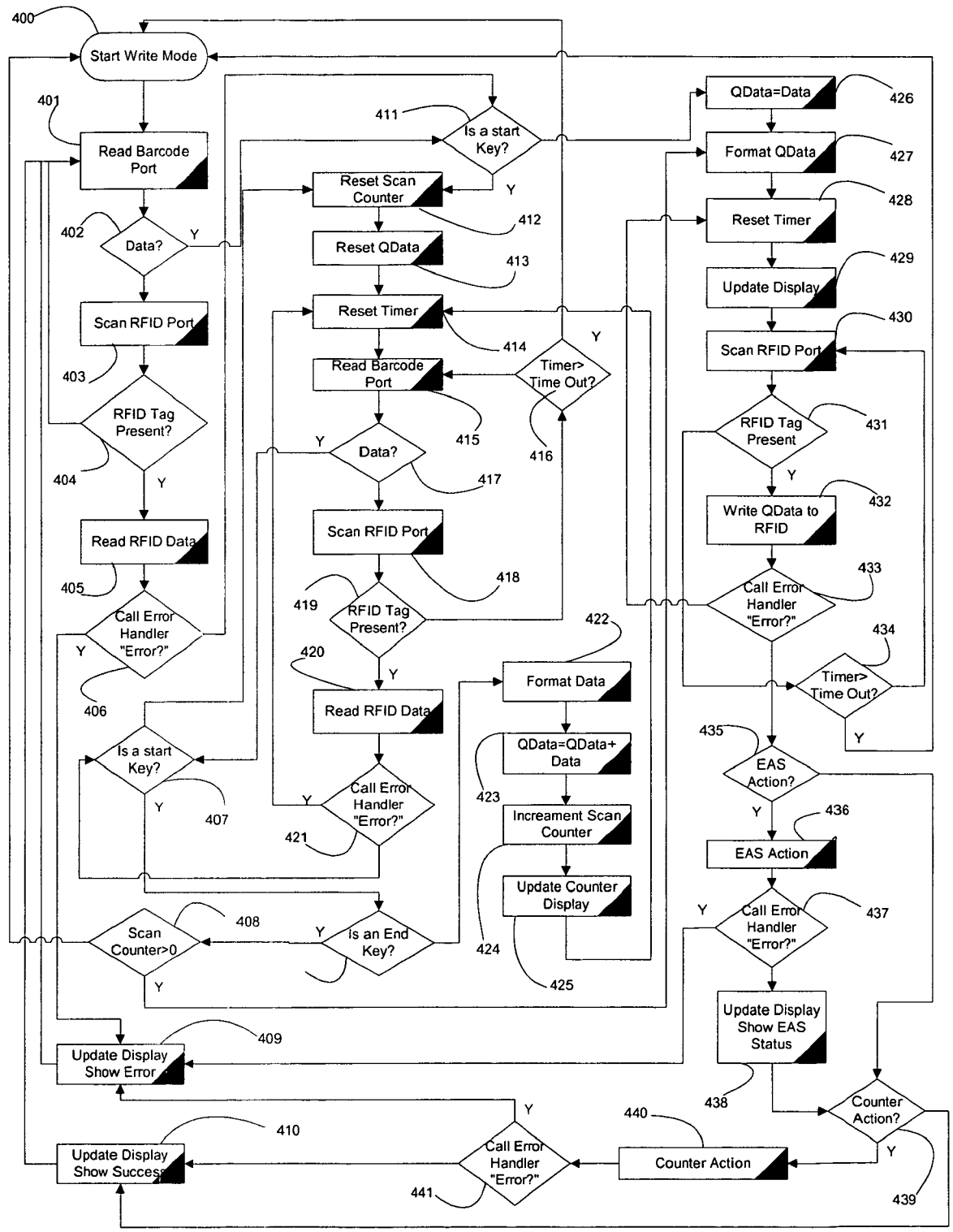
FIG. 6 is a flow chart of operations for reading barcode or RFID tag and writing its content into a RFID tag.

FIG. 6 is the flow chart that illustrates current invention's procedure of reading data from barcode symbols or RFID tags and writing such data into RFID tag. To write an RFID with data from more than one barcode symbol or RFID tag, user will scan a start key (RFID tag or barcode symbol with pre-defined data) prior to reading multiple data and later will start the write process with reading an end key (RFID tag or barcode symbol with pre-defined data) the device will give the user a pre-defined time window for approaching a RFID tag for writing, during this time device will indicates on the display that it is waiting for a RFID tag to write the data into. It is obvious that for writing a RFID tag with the content of a single barcode symbol or another RFID tag user does not need to use either start or end keys. User can set up this mode to perform the EAS and counter actions after writing the data into the RFID tag. In order to do this, controller unit 257 checks the barcode port 401 and scans the RFID port 403 for the presence of RFID tag. In the event of having data 402 on barcode port (barcode being scanned by barcode reader) controller will check if this data matches the start key 411 if not it means user has only one barcode symbol to be scanned thus controller 257 will format 427 this data based on pre-defined configuration stored in memory and starts a timer 428 and scans for the presence of RFID tag 431, as soon as this RFID tag becomes available controller 257 will send the necessary commands to RFID unit 254 for writing formatted data into the RFID tag 432 otherwise after the specified time limit controller 257 will disregard the input data and starts form 400. Upon successful writing, controller will send the necessary command set to RFID unit 254 to perform EAS action 436 and counter action 440 in the positive result of checking the settings for EAS action 435 and counter action 439.

Figure 7:
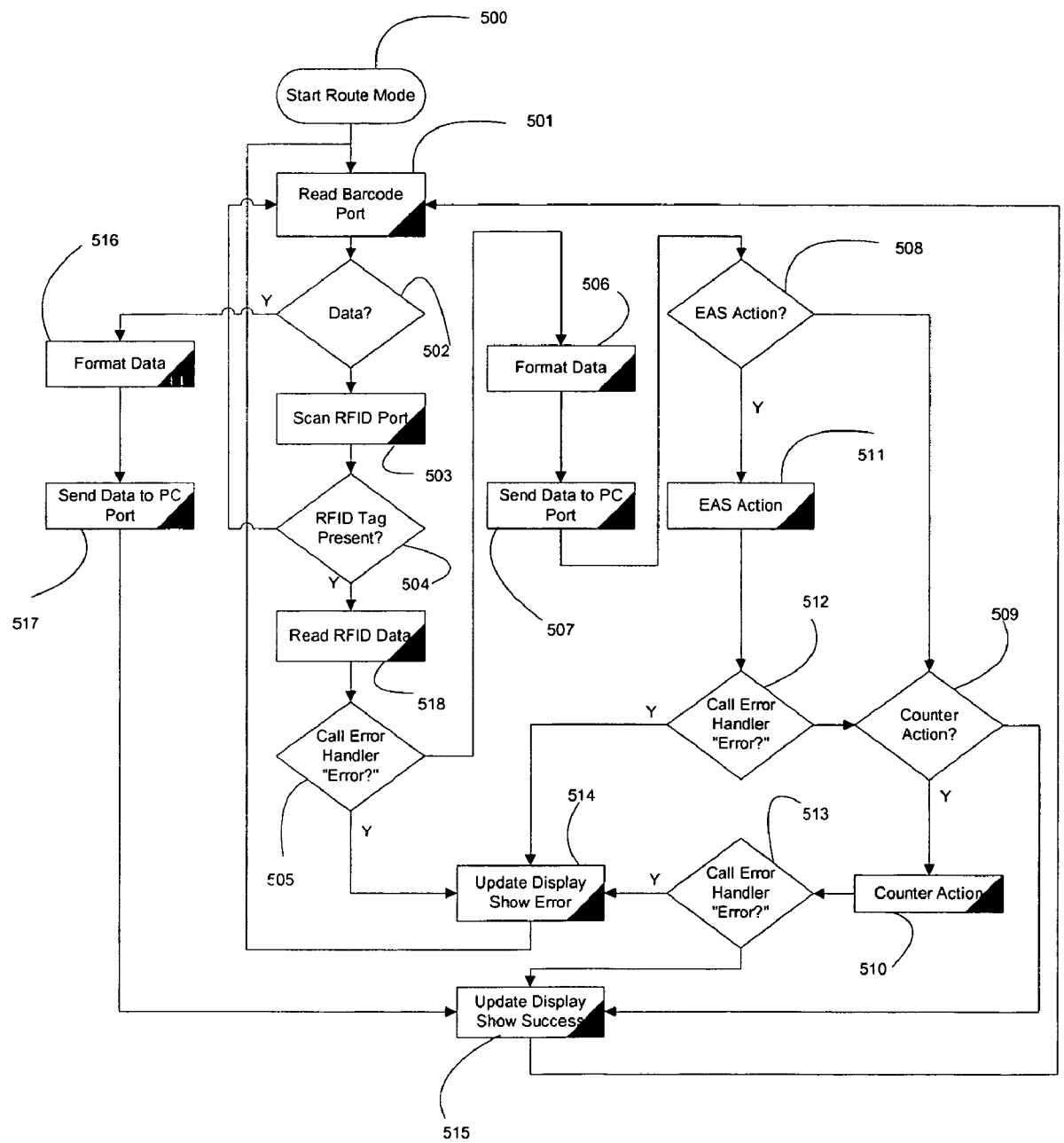
FIG. 7 is a flow chart of operations for reading data from barcode or RFID tag and further routing this data to host computer.

FIG. 7 is the flow chart that illustrates current invention's procedure of reading data from barcode symbol and RFID tags and routing such data to host computer. In order to route information without changing the application software on the host computer or installing additional drivers, controller unit 257 checks the barcode port 501 and scans the RFID port 503 for presence of RFID tag. In the event of sensing data on barcode port 502 controller unit will format this data based on the setting in the memory 516 and sends this data to PC port 517. On RFID side if presence 504 of RFID tag is intercepted, controller unit 257 will send the necessary command to RFID unit 254 to read the specified memory location of the RFID tag 518 and will send this data to PC port 507 after formatting 506. Upon successful routing, controller 257 will send the necessary command set to RFID unit 254 to perform EAS action 511 and counter action 510 if the settings for EAS action 508 and counter action 509 are set to do so.

Figure 8:
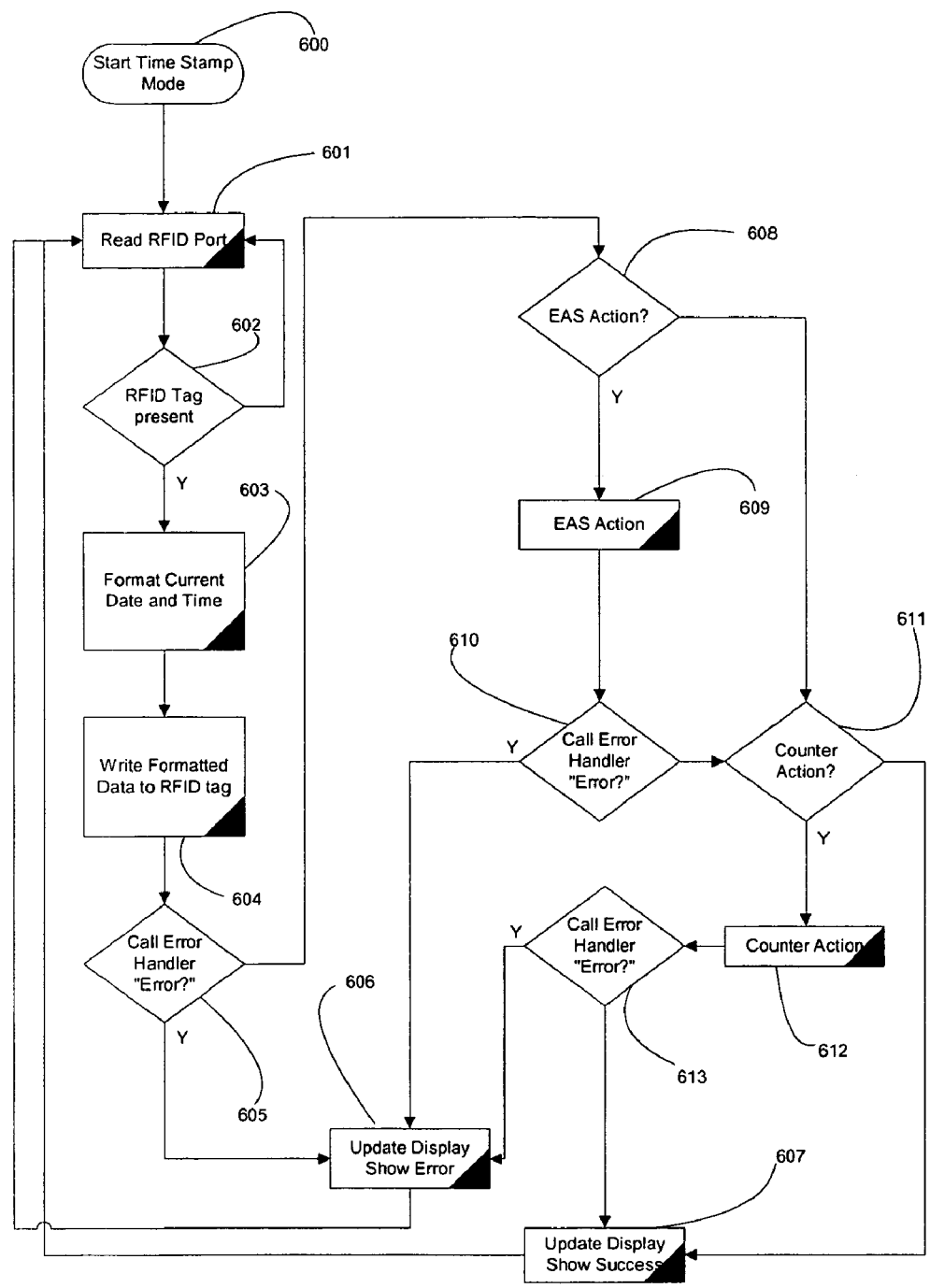
FIG. 8 is a flow chart of operations for writing current date and time into a RFID tag.

FIG. 8 is the flow chart, which illustrates current invention's procedure of writing current date and time in a user defined format to a RFID tag free of using any host computer. In order to do this step, controller unit 257 scans the RFID port 602 for presence of a RFID tag and as soon as a RFID tag becomes available, controller will read the RTC 260 and will format it 603 based on the saved format in the current mode of operation and send the necessary command to write 604 formatted data into predefined memory location of the RFID tag. Upon successful writing, if this tag is being used for loss prevention and the EAS bit operation is set to be changed, 608 controller will send the necessary command to RFID unit 254 to perform the EAS action 609 and further upon the mode of operation settings for counter action 611 it will send the command to RFID unit 254 to perform the counter action 612. User will be informed by audible and visible indicators of failure 606 or success 607 of overall procedure.

Figure 9:
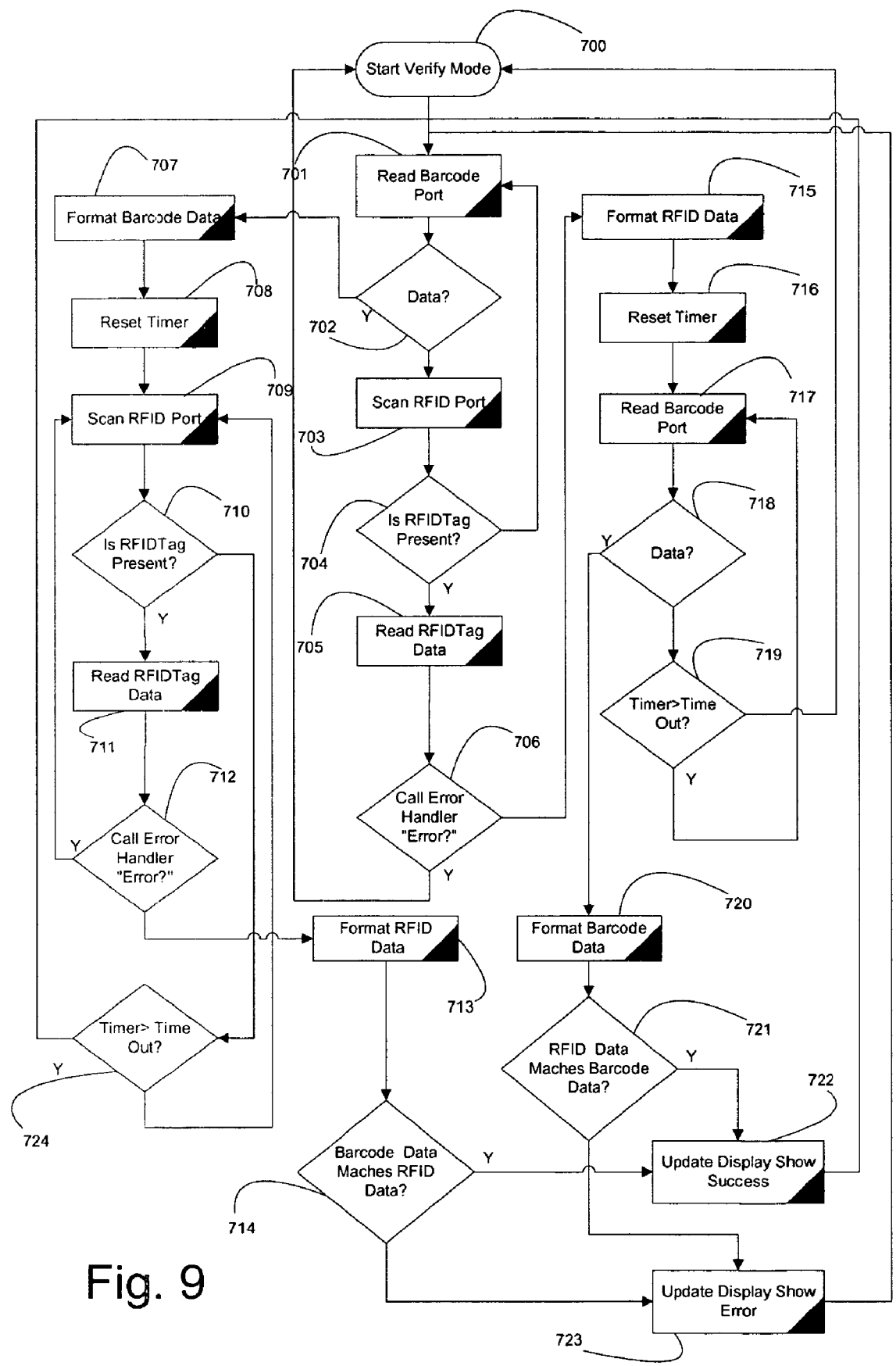
FIG. 9 is a flow chart of operations for comparing data content of and RFID tag with another RFID tag or a barcode symbol.

FIG. 9 Explains the procedure to test the RFID tag's data for a match with a barcode symbol. The user can set one of the operation modes of current invention device to perform this procedure without using any host computer. For this purpose, controller unit 257 checks the barcode port 701 and scans the RFID port 703 for the presence of a RFID tag. In the event of having data on barcode port 702 controller will format this data based on settings in the memory 707 and starts a timer 708 and scans for the presence of RFID tag 709. As soon as a RFID tag becomes 710 available, controller 257 will send the necessary commands to the RFID unit 254 for reading the pre-defined memory location of the RFID tag 711. After formatting 713 and, comparing 714 this data to the data from barcode symbol it will inform the user of its result by audible and visual 722, 723 indicators. In the case that a RFID tag presence is intercepted first, the controller unit 257 will send the necessary commands to RFID unit 254 for reading the pre-defined memory location of the RFID tag 705 and the controller unit will start a timer 716 for pre-defined period of time and expects data from barcode port 263. As soon as this data becomes available 713 on the barcode port 263 it will be formatted 720 and compared 721 to the data from the RFID tag and the user will be informed of this result 722, 723.

Figure 10:
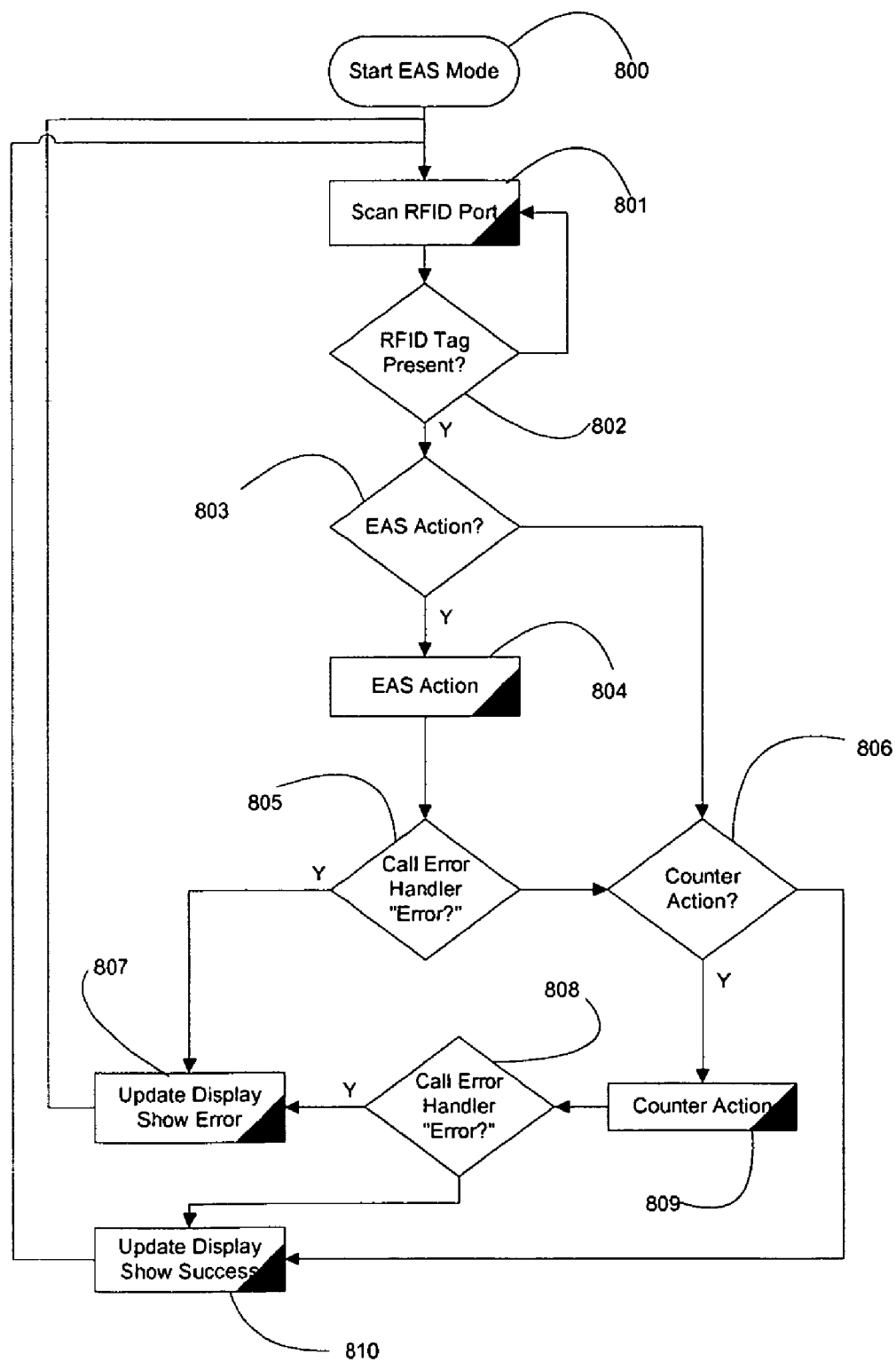
FIG. 10 is a flow chart of operations for activating, deactivating and flipping EAS bit of the RFID tag.

FIG. 10 is the flow chart of an operation mode of current invention's procedure, in which EAS action and counter action is performed without using a host computer. For this purpose the controller unit 257 scans 801 the RFID port 264 for presence of RFID tag, after the RFID tag becomes available 802 the controller unit 257 will send necessary commands to RFID unit 254 to perform the EAS action 804 and counter action 809 in accordance to the settings and informs the user 807, 810 of the overall result of the procedure.

Figure 11:
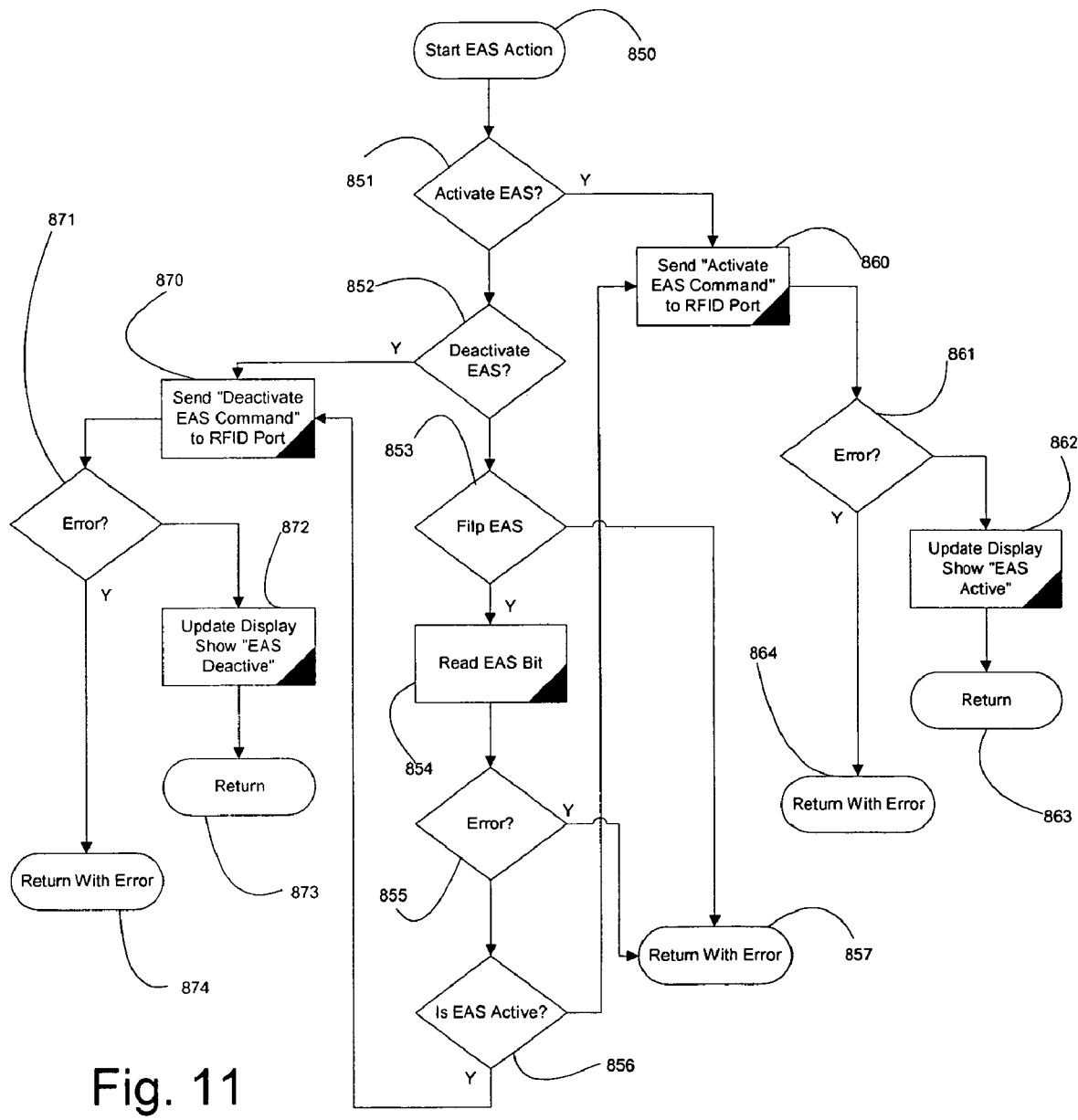
FIG. 11 is a flow chart, which further illustrates the EAS functionality.

FIG. 11 Explains the three different settings of the EAS action comprising of: activating, deactivating and flipping of the EAS bit within RFID tag. A RFID tag with activated EAS bit can be picked up by a gate antenna configuration detecting EAS bit and can be used for loss prevention when required. The EAS bit has to be deactivated during a checkout process and to be activated during the check-in process. The process starts with the controller unit 257 checking the configuration of the operation mode and decides on activating 851, deactivating 852 or flipping the EAS bit 853. In order to activate or deactivate the EAS bit, the controller unit 257 will send necessary commands to RFID unit 860, 870. In the case that EAS bit is to be flipped 853, the controller unit 257 will send a command to RFID unit to enquire the current status of the EAS bit 854 and decides further to send commands whether to activate or deactivate the EAS bit 856.

Figure 12:
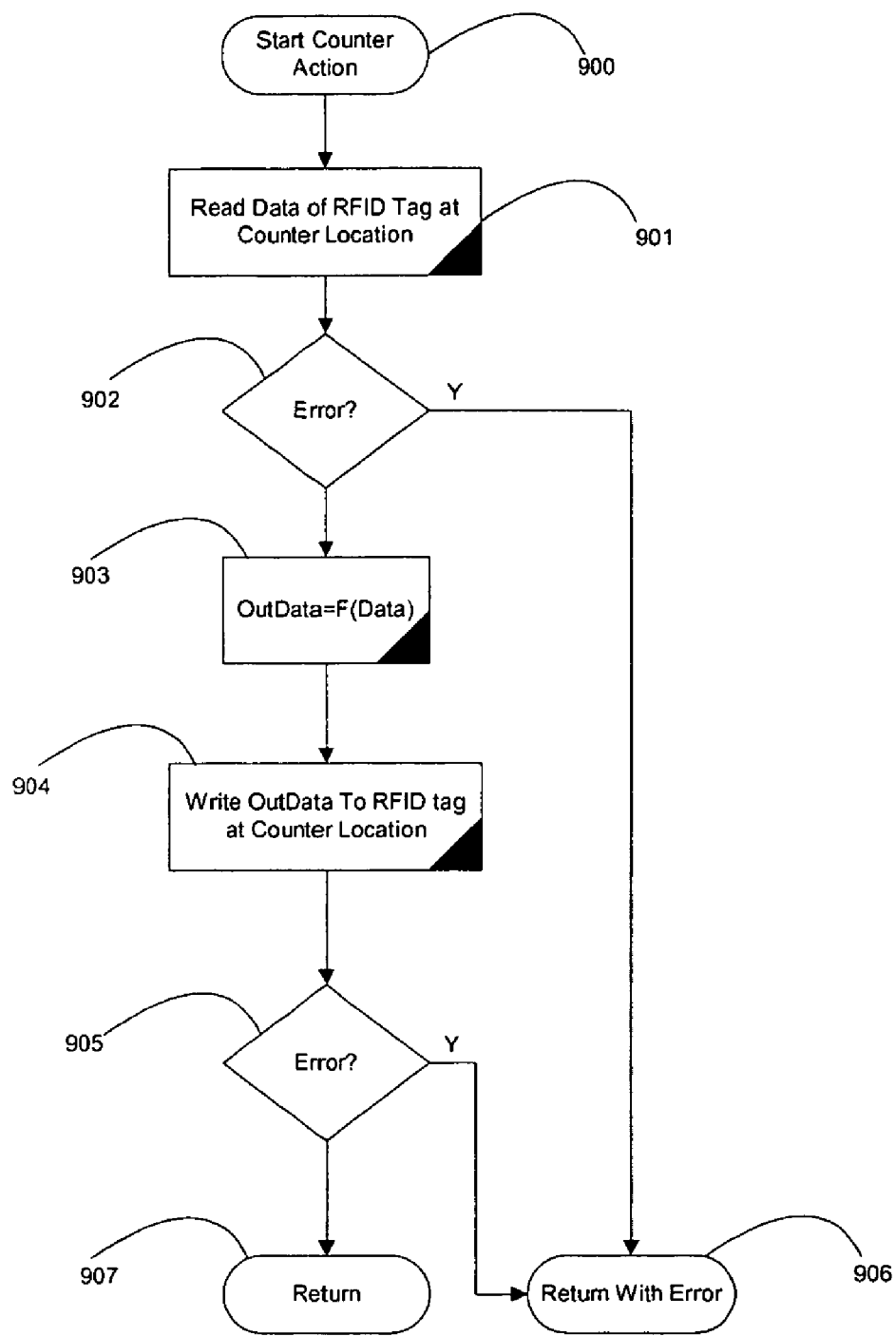
FIG. 12 is a flow chart, which further illustrates the counter functionality.

FIG. 12 is the flow chart of current invention's procedure of counter action. Counter action is the process for tracking of the execution of any action performed on the RFID tag such as read data from the RFID tag or write data into the RFID tag.

The flow chart shows how the device will write a counter with specific criteria into a RFID tag. Controller unit 257 sends a command to RFID unit 254 to read the specified location of detected RFID tag in order to retrieve the current data in that location 901 and will transform this data with predefined criteria 903 including increment and decrement functions and further sends the command to RFID unit 254 to write the transformed data into RFID tag, substituting the prior data at counter location.

EAS action is the process of changing the status of the EAS bit of a RFID tag with a RFID reader. The Counter action comprises the following steps:

Reading a designated memory location of the RFID tag into a temporary memory upon successful execution of the action such as read data or write data.

Perform a defined criteria operation on the temporary memory and writing the result back to the designated memory location of the RFID tag.

While the invention has been described with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed:

1. A method of preparing a radio frequency identification (RFID) tag, comprising:
    after recognizing a start key, monitoring a barcode reader port for barcode data from a barcode reader;
    for each of a plurality of barcodes consecutively read by said barcode reader:
        reformatting said barcode data received from said barcode reader as RFID data;
        accumulating said RFID data in memory;
    writing accumulated RFID data from memory to said RFID tag.

2. The method of claim 1 further comprising before recognizing said start key, monitoring said barcode reader port and wherein said start key is a start barcode read by said barcode reader.

3. The method of claim 1 wherein said writing accumulated RFID data from memory to said RFID tag occurs only after determining presence of an RFID tag at an RFID port.

4. The method of claim 3 said writing accumulated RFID data from memory to said RFID tag occurs only after recognizing an end key.

5. The method of claim 4 wherein said recognizing an end key comprises recognizing an end barcode read by said barcode reader.

6. The method of claim 1 further comprising storing current date and time along with a predefined location code into said RFID tag.

7. A router for preparing radio frequency identification (REID) tags, comprising:
    a barcode port for connecting to a barcode reader;
    a host port for connecting to a host computer;
    an RFID port for connecting to an RFID unit;
    a memory;
    a controller for:
        after recognizing a start key, monitoring said barcode reader port for barcode data from said barcode reader;
        for each of a plurality of barcodes consecutively read by said barcode reader:
            reformatting said barcode data received from said barcode reader as RFID data; and
            accumulating said RFID data in said memory;
        writing accumulated RFID data from said memory to said RFID tag when associated with said RFID unit.

8. The router of claim 7 wherein at least one of said scanner port, said PC port and said RFID port comprises a serial interface.

9. The router of claim 8 wherein said serial port comprises a universal serial bus (USB).

10. The router of claim 7 wherein at least one of said scanner port, or said PC port and said RFID port comprises a TCP/IP interface.

11. The router of claim 7 further comprising a display module and a buzzer both connected electrically to said controller.

12. The router of claim 7 wherein said controller is also for, before recognizing said start key, monitoring said barcode reader port and wherein said start key is a start barcode read by said barcode reader.

13. The router of claim 7 wherein said controller is for, in writing accumulated RFID data from memory to said RFID tag, writing said accumulated RFID data only after determining presence of an RFID tag at said RFID port.

14. The router of claim 13 said controller is for writing accumulated RFID data from memory to said RFID tag only after recognizing an end key.

15. The router of claim 14 wherein controller is for, in recognizing an end key, recognizing an end barcode read by said barcode reader.

* * * * *